US010202200B2

(12) United States Patent
Vialle et al.

(10) Patent No.: US 10,202,200 B2
(45) Date of Patent: Feb. 12, 2019

(54) FUEL MANIFOLD FOR AN AIRCRAFT TANK

(71) Applicant: Zodiac Aerotechnics, Roche la Moliere (FR)

(72) Inventors: Julien Vialle, Saint-Etienne (FR); Christophe Claris, Saint-Just-Saint-Rambert (FR)

(73) Assignee: Zodiac Aerotechnics (FR)

( * ) Notice: Subject to any disclaimer, the term of this patent is extended or adjusted under 35 U.S.C. 154(b) by 0 days.

(21) Appl. No.: 15/482,056

(22) Filed: Apr. 7, 2017

(65) Prior Publication Data

US 2017/0297734 A1    Oct. 19, 2017

(30) Foreign Application Priority Data

Apr. 13, 2016  (FR) ..................... 16 53278

(51) Int. Cl.
*B64D 37/32* (2006.01)
*B64D 37/00* (2006.01)
*B64D 37/02* (2006.01)

(52) U.S. Cl.
CPC ........... *B64D 37/32* (2013.01); *B64D 37/005* (2013.01); *B64D 37/02* (2013.01)

(58) Field of Classification Search
CPC ...... B64D 37/32; B64D 37/005; B64D 37/02; Y10T 137/3084; Y10T 137/2984
USPC ...................... 137/197, 170.1, 176, 590–592
See application file for complete search history.

(56) References Cited

U.S. PATENT DOCUMENTS

| | | | | |
|---|---|---|---|---|
| 1,344,738 A * | 6/1920 | Sullivan | ................. | B60K 15/06 137/571 |
| 2,405,442 A * | 8/1946 | Mayo | ....................... | B67D 7/74 137/264 |
| 4,343,353 A * | 8/1982 | Tsopelas | .................. | F01P 11/06 123/41.08 |
| 4,672,937 A * | 6/1987 | Fales | ...................... | F02M 37/08 123/495 |
| 5,746,184 A * | 5/1998 | Ekstam | .................. | F02M 37/20 123/510 |
| 6,176,260 B1 * | 1/2001 | Hahner | ................ | B60K 15/077 123/468 |
| 2015/0068625 A1 * | 3/2015 | Singh | ..................... | E03B 11/02 137/565.17 |

FOREIGN PATENT DOCUMENTS

| | | |
|---|---|---|
| WO | 2009139801 A2 | 11/2009 |
| WO | 2015099860 A2 | 7/2015 |
| WO | 3026091 A1 | 3/2016 |

* cited by examiner

*Primary Examiner* — Mary McManmon
*Assistant Examiner* — Patrick Williams
(74) *Attorney, Agent, or Firm* — Forge IP, PLLC

(57) ABSTRACT

A fuel manifold adapted to communicate with at least one fuel tank of an aircraft is presented. The manifold defines an enclosure adapted to be filled with fuel and to have an internal pressure P1 higher than the internal pressure P2 of the fuel tank. The enclosure includes at least one ceiling and at least one side wall provided with overflow holes adapted to communicate with the fuel tank. The manifold includes a mechanism for discharging an air pocket, trapped between the ceiling and the level of the overflow holes, to the fuel tank.

3 Claims, 2 Drawing Sheets

FUEL MANIFOLD FOR AN AIRCRAFT TANK

FIELD OF THE INVENTION

The present invention relates to the technical field of fuel tanks for an aircraft, such as an airplane, helicopter or the like, and more particularly relates to a fuel manifold, filled by the tanks, intended to supply the engine.

BACKGROUND OF THE INVENTION

In the aeronautics field, the regulations in force, such as certifications FAR25.981.b and CS25.981.b, or their equivalents, impose flammability constraints for the fuel contained in aircraft tanks.

In practice, the airframe manufacturer must either be able to prove that the fuel is below these flammability constraints, or establish means for reducing explosion risks.

The use of inerting systems is well known for the generation of an inert gas, such as nitrogen or any other inert gas such as carbon dioxide, and introducing said inert gas into fuel tanks in order to reduce the risk of explosion from said tanks. This solution is widely used for tanks having a large air pocket, i.e., tanks contained in the wings of the aircraft or the central tanks primarily contained in the fuselage of the aircraft.

However, it is difficult to prove compliance with the regulations in force for a fuel manifold whose primary function is to be filled with fuel to be kept constantly full in order to avoid unpriming of the supply pumps of the aircraft engine.

The manifold is intended to communicate with at least one fuel tank. FIG. 1, which schematically shows a manifold (1) according to the prior art, defines an enclosure (2) intended to be filled with fuel and to have an internal pressure P1 higher than the internal pressure P2 of the fuel tank. The enclosure (2) comprises at least one ceiling (3) and at least one side wall (4a) connected to one another so as to define at least one zone (5) between them wherein at least one air pocket (6) can be trapped. The manifold comprises overflow holes (7) arranged in the side wall (4a) near said entrapment zone (5) and intended to communicate with the fuel tank.

According to the state of the art, the overflow holes do not make it possible to discharge the trapped air pocket because structural constraints do not make it possible to position the overflow holes flush with the upper ceiling of the manifold. Furthermore, other air pockets can be trapped, in particular when the filling system of the manifold is not working and/or during particular pitch and/or roll phases.

The manifold is constantly full of fuel, such that the air pocket inside the manifold is relatively small, which limits, or even prevents any injection of inerting gas inside the manifold.

Injecting inerting gas in the manifold also cannot be considered, as it would cause an overpressure of the manifold and the fuel tank in communication therewith, the appearance of bubbles and foam that could harm the operation of the pumps situated in the tank, and an uncontrolled transfer of fuel through the overflow holes.

Moreover, it is that much more difficult to ensure compliance of the manifold with the standard in force, since it is not directly connected to an inert tank, especially if fuel degassing issues are taken into account.

In the current state of the art, to bring the manifold into compliance with the standards in force, a first solution consists in pressurizing the manifold relative to the atmospheric pressure so as to shift the flammability envelope of the fuel. However, pressurization exposes the manifold to greater structural stresses, having a significant impact on the mechanical strength of the aircraft and its operating safety. Furthermore, it is difficult to be precise in estimating this physical phenomenon with respect to the flammability of the fuel.

Another solution consists in injecting inerting gas into the fuel tank that is in communication with the manifold and considering that if the fuel tank meets the requirements of the standards in force, the manifold meets them as well. This solution is based entirely on a qualitative argument, and it is difficult to prove its effectiveness if, as mentioned above, one considers the degassing of the fuel in the manifold. Furthermore, if the fuel tank in communication does not require inerting, this solution does not work.

Another solution consists in coating some inner walls of the manifold with a foam able to prevent the spread of flames in case of ignition of the fuel and to suffocate the fire. However, aside from decreasing the working volume of the manifold, the foam absorbs a quantity of fuel that cannot be retrieved, thereby decreasing the autonomy of the aircraft. Furthermore, the foam can break down and be aspirated by the supply means of the engine. Lastly, static electricity may appear within the foam, giving rise to an ignition risk.

SUMMARY OF THE INVENTION

One of the aims of the invention is therefore to resolve these drawbacks by proposing a fuel manifold for an aircraft fuel tank, the design of which makes it possible to prove, in a guaranteed and quantifiable manner, compliance with the standards in force relating to fuel flammability constraints.

To that end, and to resolve the aforementioned problems, a fuel manifold has been designed that is intended to communicate with at least one fuel tank of an aircraft. The manifold defines an enclosure intended to be filled with fuel and to have an internal pressure P1 higher than the internal pressure P2 of the fuel tank. The enclosure comprises at least one ceiling and at least one side wall provided with overflow holes intended to communicate with the fuel tank.

According to the invention, the manifold comprises means for discharging an air pocket, trapped between the ceiling and the level of the overflow holes, to the fuel tank.

Thus, the invention makes it possible to discharge the air pocket outside the manifold, under the effect of the pressure exerted by the fuel. This pressure is generated on the one hand by the fuel level in the manifold, in particular due to the shape of the wing of the aircraft, and on the other hand, by the fuel overflow relating to the filling of the manifold.

The air pocket is oriented toward the adjacent fuel tank, the pressure of which is lower, and rejoins the air pocket of said tank. As a result, the manifold does not require any system for inerting the manifold, since there is no air pocket. The solution is therefore adaptable to any aircraft configuration. The aircraft benefits from gains in terms of weight and reliability, and simpler operation of the inerting system. The certification of compliance with standards is also made easier. The invention also makes it possible to decrease interactions with the fuel management system, in particular the pumps and ejectors, and avoids the problems of fuel transfers to the inerting gas generating system, or transfers from the manifold to the other tanks of the aircraft. The discharge of the air pocket from the manifold generates a fuel transfer from the tank to the manifold. This transfer will need to be taken into account when computing the total overflow of the manifold.

According to one particular embodiment, the discharge means assume the form of at least one inclined face connecting the side wall and the ceiling, and positioned such that the overflow holes are arranged flush with said inclined face. Thus, the inclined face allows the air pockets trapped at the ceiling to be discharged toward the adjacent tank through the overflow holes.

According to another embodiment, the discharge means assume the form of at least one hose having at least one inlet arranged between the ceiling and the level of the overflow holes, and an outlet arranged outside the manifold and intended to communicate with the adjacent fuel tank.

Thus, given that the pressure inside the manifold is higher than that of the adjacent tank, the air pockets trapped at the ceiling are drained and discharged through the hose toward the fuel tank.

In order to gather the air pockets around a specific zone and decrease the number of hoses to be implemented, the ceiling of the enclosure is concave.

BRIEF DESCRIPTION OF THE DRAWINGS

Further advantages and features will become more apparent from the following description, given by way of a non-limiting example, of the fuel manifold according to the invention, from the attached drawings wherein.

DETAILED DESCRIPTION OF THE INVENTION

Figure 1:
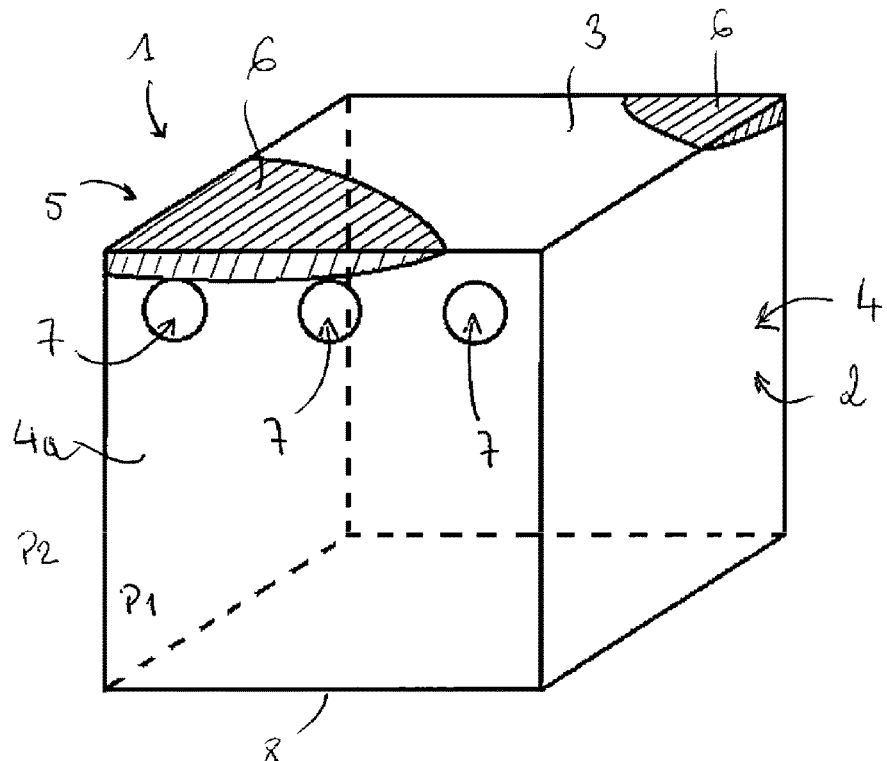
FIG. 1 is a schematic perspective view of a fuel manifold according to the prior art.
Figure 2:
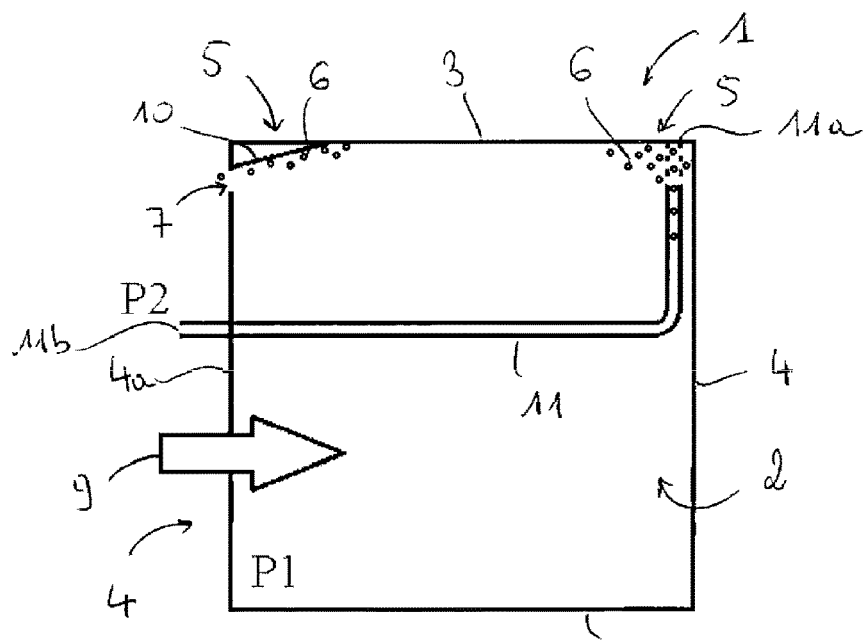
FIG. 2 is a schematic sectional side view of a fuel manifold according to the invention.
Figure 3:
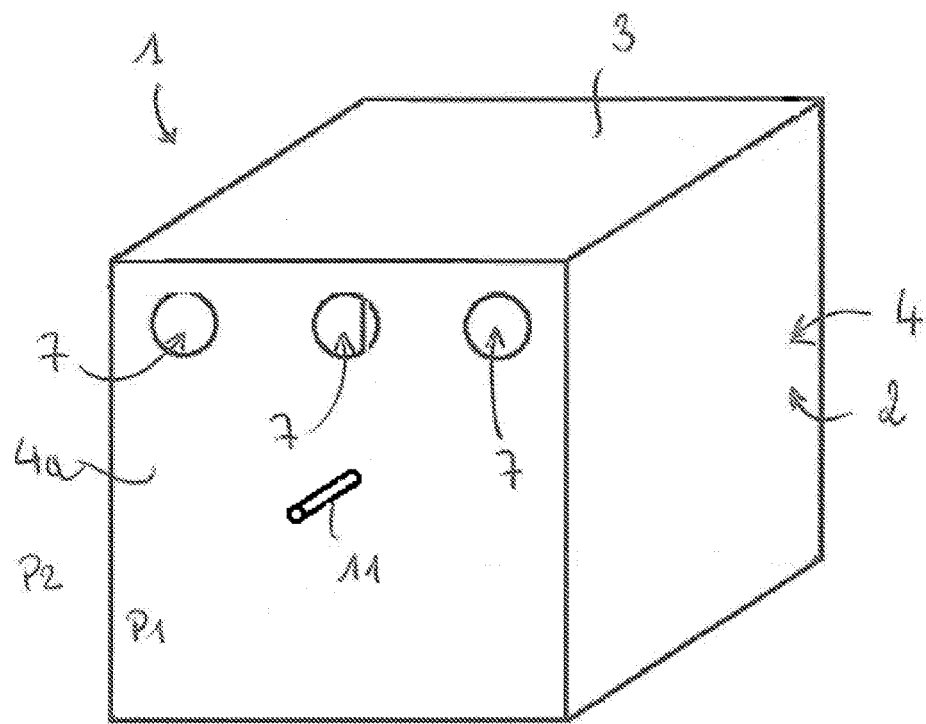
FIG. 3 is a scematic perspective view of a fuel manifold according to the invention.

In reference to FIGS. 2 and 3, the invention relates to a fuel manifold (1) for an aircraft fuel tank.

The manifold (1) generally comprises side walls (4), a bottom (8) and a ceiling (3) connected to one another to form an enclosure (2) defining a fuel receiving space.

The manifold (1) is rigidly attached to fuel filling means (9), well known in the state of the art, to keep the enclosure (2) of the manifold (1) full of fuel at all times. The manifold (1) comprises fuel overflow holes (7), in particular at one of its side walls (4a). The enclosure (2) has an internal pressure P1 higher than the internal pressure P2 of the fuel tank to which the manifold (1) is connected.

The connection between the ceiling (3) and the side walls (4) of the manifold (1) defines entrapment zones (5) within which air pockets (6) can be trapped. To that end, the manifold (1) comprises means for discharging trapped air pockets (6) toward the overflow holes (7) in order to discharge them toward the fuel tank. The discharge means for example assume the form of at least one inclined face (10) connecting the side wall (4a) and the ceiling (3). The inclined face (10) is arranged such that the overflow holes (7) are arranged flush with said inclined face (10).

Thus, given the pressure difference between the inside of the enclosure (2) and the fuel tank, the air pockets (6) slide along the inclined face (10) and are discharged through the overflow holes (7) to rejoin the air pocket of the fuel tank, said tank being rigidly attached to a system for generating and injecting inerting gas.

For the other entrapment zones (5), defined at the connection between the ceiling (3) and the other side walls (4) that do not comprise overflow holes (7), the manifold (1) comprises a hose (11) having at least an inlet (11a) arranged within said entrapment zone (5) and an outlet (11b) arranged outside the manifold (1) and in the adjacent fuel tank. Given the pressure difference between the manifold (1) and the adjacent tank, the other air pockets (6) are discharged, via the hose (11), toward said adjacent tank. According to one particular embodiment, the inlet (11a) of the hose (11) is perforated with orifices and is fastened at the ceiling (3) of the manifold (1).

Several discharge hoses (11) can be implemented, independently of whether or not the manifold (1) comprises an inclined face (10), the inlets (11a) of which are arranged in different locations at the ceiling (3), between said sealing (3) and the level of the overflow holes (7). The manifold (1) can also comprise a discharge hose (11) whereof the inlet (11a) is arranged at the inclined face (10).

Figure 4:
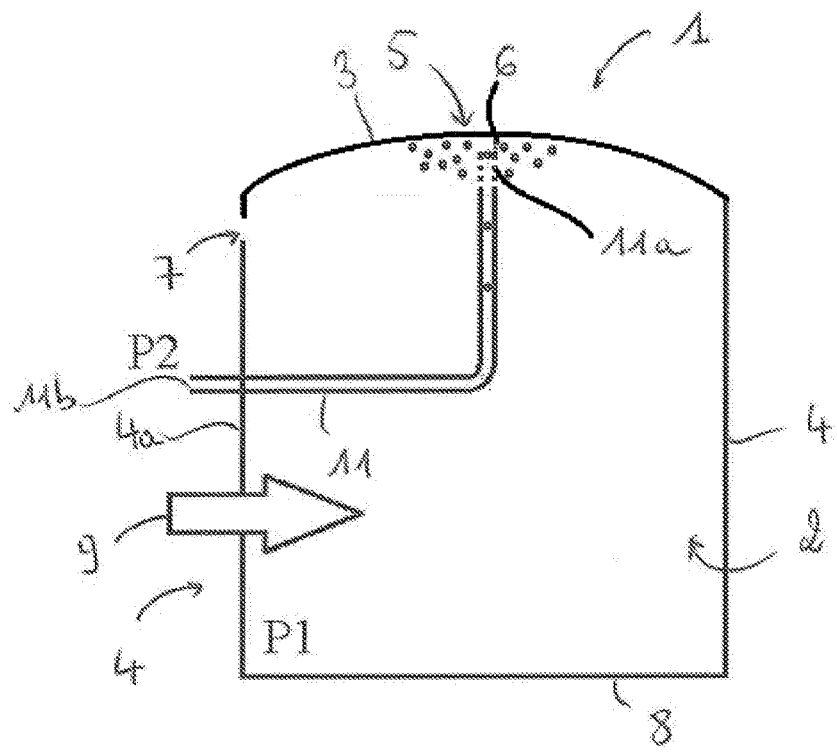
FIG. 4 is a schematic sectional side view of a fuel manifold according to another aspect of the invention.

Advantageously, as shown in FIG. 4, and in order to gather the air pockets (6) around a specific zone and decrease the number of hoses (11) to be implemented, the ceiling (3) of the enclosure (2) is concave.

The discharge of air pockets (6) from the manifold (1) generates a fuel transfer from the tank to the manifold (1).

The preceding shows that the design of the fuel manifold (1) according to the invention makes it possible to prove, in a guaranteed and quantifiable manner, its compliance with the standards in force relative to fuel flammability constraints, since it makes it possible to discharge the air pockets in order to avoid fuel ignition risks.

What is claimed is:

1. A fuel manifold adapted to communicate with at least one fuel tank of an aircraft, said manifold defining an enclosure adapted to be filled with fuel, the enclosure comprising at least one ceiling and at least one side wall provided with overflow holes adapted to communicate with the fuel tank, wherein the manifold comprises means for discharging an air pocket trapped between the ceiling and the level of the overflow holes to the fuel tank, wherein the discharge means assume the form of at least one hose having at least one inlet arranged between the ceiling and the level of the overflow holes, and an outlet arranged outside the manifold and adapted to communicate with the fuel tank.

2. The manifold according to claim 1, wherein the ceiling of the enclosure is concave.

3. A fuel manifold adapted to communicate with at least one fuel tank of an aircraft, said manifold defining an enclosure adapted to be filled with fuel, the enclosure comprising at least one ceiling and at least one side wall provided with overflow holes adapted to communicate with the fuel tank, wherein the manifold comprises means for discharging an air pocket trapped between the ceiling and the level of the overflow holes to the fuel tank, wherein the discharge means assume the form of at least one inclined face connecting the side wall and the ceiling, and positioned such that the overflow holes are arranged flush with said inclined face.

* * * * *